United States Patent [19]

Rinehart et al.

[11] Patent Number: 4,556,893
[45] Date of Patent: Dec. 3, 1985

[54] OPTICAL RECORDING MEDIUM OF HIGH SENSITIVITY

[75] Inventors: Thomas A. Rinehart, St. Paul, Minn.; Richard F. Willson, Hudson; Vaughn W. Halling, River Falls, both of Wis.

[73] Assignee: Minnesota Mining and Manufacturing Company, St. Paul, Minn.

[21] Appl. No.: 466,435

[22] Filed: Feb. 15, 1983

[51] Int. Cl.⁴ .............................................. G01D 15/34
[52] U.S. Cl. ................................ 346/135.1; 346/76 L; 369/122; 369/284; 430/945
[58] Field of Search .................. 346/135.1, 76 L; 430/945, 348; 369/288, 284, 122

[56] References Cited

U.S. PATENT DOCUMENTS

| | | | |
|---|---|---|---|
| 4,097,895 | 5/1978 | Spong | 358/128 |
| 4,216,501 | 8/1980 | Bell | 358/128.5 |
| 4,264,911 | 4/1981 | Wilkinson | 346/135.1 |
| 4,282,534 | 8/1981 | Shinozaki | 346/135.1 X |
| 4,285,056 | 8/1981 | Bell | 369/100 |
| 4,300,227 | 11/1981 | Bell | 369/84 |
| 4,335,198 | 6/1982 | Hanada | 346/135.1 X |
| 4,430,659 | 2/1984 | Maffitt | 346/135.1 |

FOREIGN PATENT DOCUMENTS 0058496 8/1982 European Pat. Off. .

OTHER PUBLICATIONS

"Optical Disk Systems Emerge", by Bartolini et al., IEEE Spectrum, vol. 15, No. 8, Aug. 1978, pp. 20–28.
"Optical Recording with the Encapsulated Titanium Trilayer", by Bell et al., RCA Review, vol. 40, Sep. 1979, pp. 345–362.

Primary Examiner—Joseph W. Hartary
Attorney, Agent, or Firm—Donald M. Sell; James A. Smith; William B. Barte

[57] ABSTRACT

Optical recording medium having a laser-recordable light-absorbing layer which is a carbide of iron or chromium has surprisingly high sensitivity. High carrier-to-noise ratios are attained using a laser-diode recording system at power levels below 10 mW.

17 Claims, 6 Drawing Figures

OPTICAL RECORDING MEDIUM OF HIGH SENSITIVITY

TECHNICAL FIELD

The invention relates to an optical recording medium which is recordable by a focused, modulated light beam, such as a light beam from a laser. The medium has a light-absorbing recording layer which upon absorbing energy from the light beam develops discrete features such as pits or bubbles which represent information. Since that information is immediately available for optical playback, the medium is called an optical DRAW (Direct-Read-After-Write) medium. The invention particularly concerns the light-absorbing recording layer of such a medium.

BACKGROUND ART

A preferred optical DRAW medium has a trilayer construction comprising a continuous reflecting layer on an optically-flat, disk-shaped, polymeric or glass substrate, a continuous, transparent optical spacer layer overlying the reflecting layer, and a continuous light-absorbing recording layer overlying the optical spacer. If the substrate itself is reflective, it may serve as the reflecting layer. A trilayer medium is schematically illustrated together with bilayer and monolayer media at page 25 of "Optical Disk Systems Image", by Bartolini et al., IEEE Spectrum, Vol. 15, No. 8, August 1978, pages 20–28. The layer or layers of those optical DRAW media and their thicknesses are chosen to minimize wasteful reflections and to maximize the absorption of the focused light beam at the light-absorbing layer. Thickness suggested for the light-absorbing layer are from about 5 to 50 nm.

U.S Pat. No. 4,097,895 (Spong) shows a bilayer medium comprising light-absorbing and reflecting layers. Its light-absorbing layer is a dye such as fluorescein which is vaporized by a focused light beam to form pits. U.S. Pat. No. 4,216,501 (Bell) shows a trilayer medium wherein the light-absorbing layer is a metal such as titanium or rhodium which is melted to form pits. U.S. Pat. No. 4,300,227 (Bell) shows a trilayer medium wherein the focused light beam causes an optical spacer layer to melt, sublime or decompose to produce gases which cause a bubble to form in a metallic light-absorbing layer. Thicknesses suggested for the light-absorbing layer are from about 2 to 25 nm. In the trilayer optical recording medium of U.S. Pat. No. 4,285,056 (Bell), information is recorded either as pits in both a metallic light-absorbing layer and an optical spacer layer, or as a bubble in the light-absorbing layer. The trilayer medium of European Patent Office application EP No. 58496 (Maffitt et al.) has a light-absorbing layer which is a refractory material, preferably amorphous carbon, boron, silicon, or alloys therebetween. Less preferred as the refractory material are borides, nitrides, carbides, oxides, and silicides. Useful are carbides of Al, Hf, Nb, Ta, Ti, V, W and Zr having a melting point in excess of 3000 K.

Although trilayer DRAW media discussed above are effective for use with argon laser and helium/neon laser recording systems, they are not as satisfactory for recording systems based on a laser diode which is the currently preferred light source, being much less expensive, having low power requirements, and providing very fast modulation speeds. Laser diodes typically emit recording wavelengths within the range of 700 to 900 nm.

Whatever the laser and whether or not the features are pits or bubbles, the ultimate objective is to create features such that when the recorded information is played back, the reproduced signals are essentially identical to the recorded signals, as evidenced by high signal-to-noise or carrier-to-noise ratios.

DISCLOSURE OF INVENTION

Like the prior optical recording media discussed above, the novel optical recording medium is a DRAW medium and comprises an optically-flat, disk-shaped, polymeric or glass substrate having a continuous, light-absorbing layer in which information is recordable in the form of discrete features created by a focused, modulated laser beam in its light-absorbing layer. The novel optical recording medium may be trilayer, or bilayer (i.e., either no optical spacer layer or no reflecting layer), or monolayer (i.e., only the light-absorbing layer). The novel recording medium differs from prior media in that its light-absorbing recording layer comprises a carbide of a metal selected from iron, chromium, and alloys therebetween. Because these carbides have good environmental stability, media of the invention are suitable for archival information storage. Chromium carbides of the formula $Cr_xC$ (where $x=1$ to 4) have particularly good environmental stability.

The novel recording medium has surprisingly high sensitivity and is especially useful in a laser-diode recording system. High carrier-to-noise ratios are achieved at laser-diode wavelengths and very low power levels.

For recording with a laser diode at wavelengths between 700 and 900 nm, the thickness of the light-absorbing layer should be within the range of about one to 60 nm, preferably about 3 to 20 nm. Sensitivity would be reduced at greater thicknesses, while it would be difficult to assure that the layer would be continuous (i.e., free from discontinuities) if deposited to a thickness of less than about one nm. Furthermore, if its thickness were less than about one nm, it might not absorb enough energy to form uniform, discrete features.

Regardless of whether the novel optical recording medium is monolayer, bilayer, or trilayer, there preferably is an additional adhesion-promoting layer between the lowermost of those layers and the substrate. The adhesion-promoting layer desirably is selected to provide nucleation sites for that lowermost layer.

The carbides of chromium and iron provide sensitivity to laser-diode recording equal to or better than would be provided by any of the carbides named in the aforementioned European patent application that have been tried, namely the carbides of hafnium, niobium, tantalum, and titanium. Furthermore, the carbides of chromium and iron are readily deposited to provide defect-free layers of highly uniform thickness, whereas difficulty has been encountered in depositing some of the other carbides, especially niobium carbide. Layers of carbides of aluminum and zirconium were found not to be as stable as are layers of carbides of chromium and iron.

When a typical trilayer recording medium of the invention is a disk rotated at 1800 rpm and subjected to a focused, modulated laser-diode beam at an incident-light peak power level of 6 mW (10 MHz) while rotating at 1800 rpm, pits are formed and a carrier-to-noise (C/N) ratio of 50 dB is attained at a resolution bandwidth of 30 kHz. At 3 mW (2.5 MHz) and a recording speed of 450 rpm, pits also are formed and a 50 dB C/N ratio is typically achieved. If either the power level is reduced or the recording speed is increased, bubbles may be formed rather than pits, and the C/N ratios may be somewhat lower although still useful. Minor accidental variations in recording power levels can result in variations in bubble shapes or in holes forming in some of the bubbles, with resultant decreased C/N ratios. On the other hand, such variations are relatively inconsequential as long as the power level is sufficiently high to form pits, so that it usually is preferred to operate at power levels which form pits.

When the novel medium includes an optical spacer layer and the recording light beam impinges on the outer surface of the light-absorbing layer, their total optical thicknesses are preferably an odd-integer number of ¼ wavelengths of the light to provide an interferometrically antireflective condition. If the novel medium also has a reflecting layer, its effective thickness should also be taken into account, as is known in the art.

As suggested in "Optical Recording with the Encapsulated Titanium Trilayer" by Bell et al., RCA Review, Vol. 40, September 1979, pages 345-362, there may be a protective overcoat over the light-absorbing layer, and there may also be a thermal barrier between those two layers.

MODES FOR CARRYING OUT THE INVENTION

Figure 1:
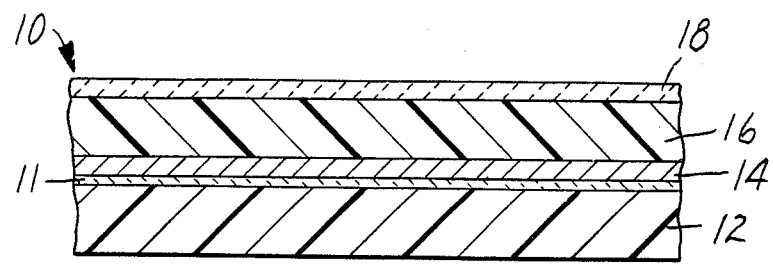
FIG. 1 is a cross-section of a trilayer optical recording medium of the invention.

FIG. 1 shows in cross-section a trilayer optical recording medium 10 consisting of a substrate 12 which is covered by an adhesion-promoting layer 11 which in turn is covered by a reflecting layer 14 which in turn is covered by an optical spacer layer 16 which in turn is covered by a light-absorbing recording layer 18.

Figure 2:
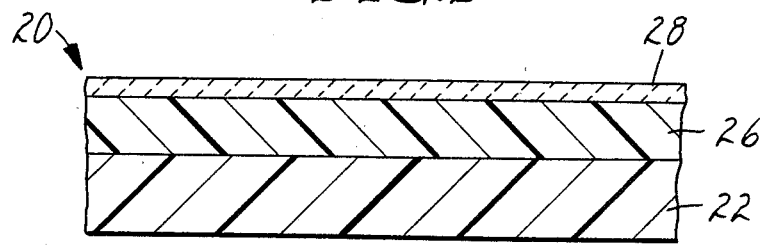
FIG. 2 is a cross-section of bilayer optical recording medium of the invention.

FIG. 2 shows in cross-section a bilayer optical recording medium 20 consisting of a substrate 22 having an optical spacer layer 26 and a light-absorbing recording layer 28. Because there is no reflecting layer, the recording light beam can be directed from either side of this medium if the substrate 22 and optical spacer layer 26 are transparent. Hence, two media 20 can be assembled and used as illustrated in U.S. Pat. No. 4,264,911 (Wilkinson).

Figure 3:
FIG. 3 is a cross-section of a monolayer optical recording medium of the invention.

FIG. 3 shows in cross-section a monolayer optical recording medium 30 consisting of substrate 32 having a light-absorbing recording layer 38.

Figure 4:
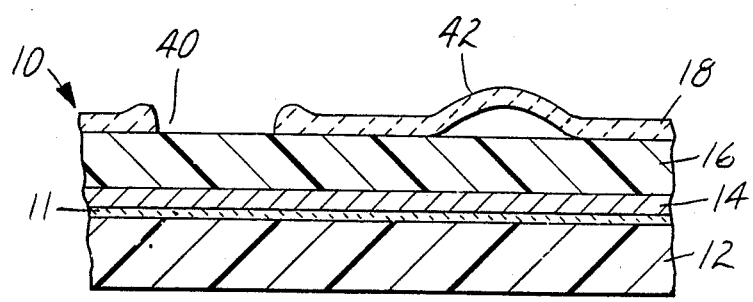
FIG. 4 is a cross-section of the optical recording medium of FIG. 1 in which information has been recorded both as pits and as bubbles.

FIG. 4 shows in cross-section the trilayer medium 10 of FIG. 1 in which information has been recorded via ablative action to produce a pit 40 and has also been recorded as a bubble 42 produced by the localized formation of gaseous products at the interface between the light-absorbing layer 18 and the optical spacer layer 16. Although such gaseous formation may have eliminated part of the optical spacer layer, the amount may be so minute that it cannot be verified microscopically and so is not shown in the drawing. On the other hand, the pit 40 may extend into the optical spacer layer. Since information is usually recorded at only one power level and duration, each medium is usually recorded with only pits or bubbles.

The substrates 12, 22 and 32 may be formed of any glass or polymeric material which is dimensionally stable, thus minimizing radial displacement variations during recording and playback. Preferred is poly-methylmethacrylate, both for its good dimensional stability and also because it readily provides a smooth surface, thereby minimizing noise during playback.

The reflecting layer 14 is preferably a metal having a high degree of reflectivity such as copper, aluminum or gold. Metals are preferably applied by electrodeposition or vacuum deposition to a thickness of 0.001 to 1.0 micrometers and should reflect at least 50% of the incident light.

The light-absorbing layers 18, 28 and 38 may be $Cr_3C_2$ (melting point 2163° K.) or $Fe_3C$ (melting point 1923° K.). The material of the optical spacer layer should be selected to provide enhanced sensitivity by virtue of reduced thermal diffusivity. U.S. Pat. No. 4,300,227 suggests that substantially improved sensitivity is realized when the optical spacer layer is an organic material having a melting point substantially lower than that of the light-absorbing layer.

Organic materials suitable for the optical spacer layers 16 and 26 include hydrocarbon polymers such as poly-methylmethacrylate, fluorocarbon polymers such as polyvinyl fluoride, and chlorocarbon polymers such as polyvinyl chloride. A preferred inorganic material is silicon dioxide.

EXAMPLE 1

After cleaning a polymerically-subbed aluminum disk having a diameter of 30 cm, chromium sub-oxide was deposited by magnetically-assisted sputtering using a Cr target in an atmosphere of argon, water vapor and air. The sputtering was continued for about one to two minutes at a target current of about 500 mA and a background operating pressure of about $3 \times 10^{-3}$ Pa, thereby obtaining a nucleation/adhesion-promoting layer about 1–5 nm thick.

Over this, a reflecting layer of copper was applied by vacuum evaporation at a background pressure of about $10^{-4}$ Pa to a thickness of about 160 nm.

An RF plasma polymerization unit was then utilized to plasma-deposit a feed mixture of about 90 wt. % methylmethacrylate vapor and about 10 wt. % acrylic acid vapor, which mixture was introduced at a mass flow rate of about $4 \times 10^{-4}$ g/s, while argon was introduced at a mass flow rate of about $3 \times 10^{-5}$ g/s and a background operating pressure of about 10 Pa was maintained. A plasma polymerizing power of about 55 watts was utilized corresponding to a power density of about 3.8 kW/m³ and a power flux of about 380 W/m². Deposition for about 10 minutes provided a poly-methylmethacrylate optical spacer layer about 100 nm in thickness.

Electron beam evaporation, with a beam voltage of about 10 kV and a beam current of about 0.11 A, was utilized to deposit a light-absorbing recording layer of $Cr_3C_2$ to a thickness of about 5.2 nm. Background operating pressure was about $7 \times 10^{-5}$ Pa. A deposition rate of 0.1 nm/s was achieved.

Recording experiments were performed on this trilayer medium rotating at 1800 rpm using a laser diode light source at about 820 nm with a 0.6 numerical aperture focusing lens incident upon the exposed surface of the light-absorbing layer. When a 10-MHz square-wave signal was recorded at a radius of about 125 mm, using 50-ns pulses at an incident-light peak power level of 4.2 mW, a C/N ratio of 40 dB was achieved upon playback. Scanning electron microscope examination revealed the presence of well-defined protuberances or bubbles similar to the bubble 42 of the trilayer medium 10 in FIG. 4 of the drawing.

Raising the incident-light peak power level to about 5.5 mW resulted in the initiation of ablation of the light-absorbing layer 18 and formation of openings or pits similar to the pit 40 in FIG. 4.

At an incident-light peak power level of about 7.0 mW and 50-ns pulses, a C/N ratio of 50 dB was achieved upon playback. Scanning electron microscope examination revealed the presence of well-defined openings or pits in the light-absorbing layer. The edges of those openings were smooth and free from any irregularities, and there was no evidence of ablation-induced debris.

At record power levels of 8.0, 9.0 and 10.0 mW, the C/N ratios on playback were 48, 52, and 54 dB, respectively.

EXAMPLE 2

Figure 5:
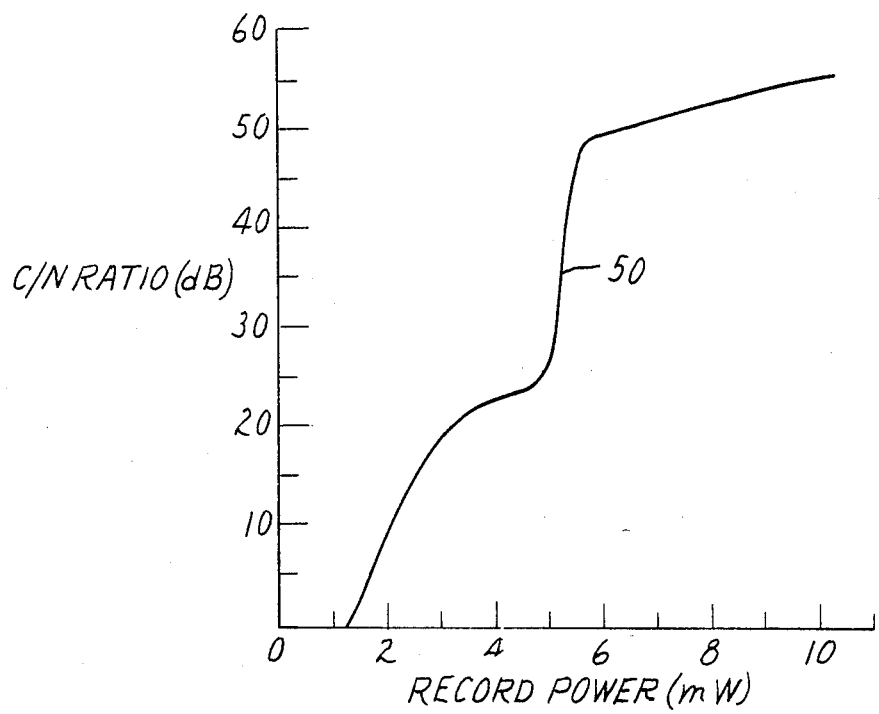
FIG. 5 shows carrier-to-noise ratios achieved in the optical recording medium of FIG. 1 using a laser diode at various incident-light record power levels.

A trilayer disk was made and recorded as in Example 1. C/N ratios on playback are shown by curve 50 of FIG. 5.

Figure 6:
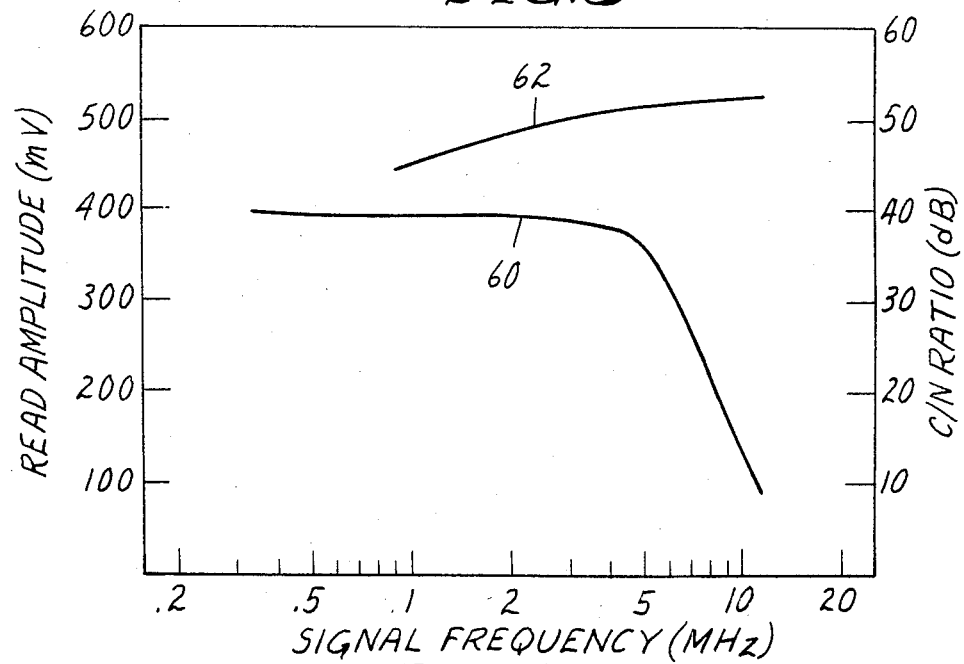
FIG. 6 shows two curves obtained using the optical recording medium of FIG. 1, one curve being a function of read amplitude versus signal frequency and the other a function of carrier-to-noise ratio versus signal frequency.

The same trilayer disk was recorded in the same manner except that the square-wave signal was adjusted to various signal frequencies at an incident-light peak power level of 7.8 mW. Curve 60 of FIG. 6 is a plot of signal frequencies vs. read amplitudes and curve 62 is a plot of signal frequencies vs. C/N ratios.

EXAMPLE 3

An optical recording medium was prepared as in Example 1 except that the light-absorbing layer was $Fe_3C$ deposited at beam voltage of about 10 kV and a beam current of about 0.04 A to a thickness of about 5 nm.

When a 10-MHz square-wave signal was dynamically recorded upon this medium as in Example 1, but at an incident-light peak power level of 6.9 mW, a C/N ratio of 40 dB was achieved on playback. Raising the incident-light peak power level to 7.5 mW resulted in a C/N of 50 dB. In both instances scanning electron microscope examination revealed well-defined pits which had smooth edges and were free of irregularities and ablation debris.

Bubble formation was observed at incident-light peak power levels below about 6.0 mW, resulting in C/N ratios of less than 40 dB.

EXAMPLE 4

A monolayer recording medium was prepared by depositing directly onto a polycarbonate disk $Cr_3C_2$ at a beam voltage of 10 kV and a beam current of 0.13 A to a thickness of about 9 nm. The procedure was the same as was used in Example 1 for depositing the light-absorbing layer.

When a 3.3-MHz square-wave signal was dynamically recorded upon this medium as in Example 1, but at a rotation speed of 600 rpm and a pulse length of 150 ns and an incident-light peak power level of 7 mW, bubbles were formed in the $Cr_3C_2$ light-absorbing layer, and a C/N ratio of 34 dB was achieved on playback.

EXAMPLE 5

A monolayer recording medium was prepared by depositing onto a subbed poly-methylmethacrylate disk, as in Example 4, $Cr_3C_2$ at a beam voltage of 10 kV and a beam current of 0.13 A to a thickness of about 9 nm. This medium was recorded by focusing the laser diode onto the $Cr_3C_2$ light-absorbing layer through the poly-methylmethacrylate substrate. At an incident-light peak power level of 5 mW with a pulse length of 250 ns, bubbles were formed in the light-absorbing layer.

EXAMPLE 6

A bilayer recording medium was prepared by depositing onto a poly-methylmethacrylate disk first a copper light-reflecting layer about 3 nm in thickness and then, as in Example 4, a $Cr_3C_2$ light-absorbing layer about 11 nm in thickness. A 2.5-MHz square-wave signal was recorded at a radius of 143 mm, disk speed of 420 rpm, and pulse length of 200 ns. At an incident-light peak power level of 7 mW, bubbles were formed in the $Cr_3C_2$ layer, and a C/N ratio of 40 dB was obtained.

EXAMPLES 7-8

Onto a glass disk 35.5 cm in diameter and about 1 mm in thickness, chromium was deposited by magnetically-assisted reactive sputtering to provide a layer of oxide of chromium about 1-5 nm in thickness. Over this adhesion-promoting layer, copper was deposited by vacuum evaporation using resistance heating to provide a reflecting layer having a thickness of about 160 nm. Over the copper layer poly-methylmethacrylate was deposited by plasma polymerization to provide an optical spacer layer about 120 nm in thickness. The disk was then cut into segments 2.5 cm in width and 5 cm in length.

Onto the optical spacer layer of each segment was deposited a light-absorbing layer to a thickness such that said layer would absorb of 31±2% of light at 830 nm upon a single pass. Baseline specular reflectance measurements were then made at 800 nm using a Gamma Scientific Spectroradiometer.

The segments were placed in a programmable environment chamber, initially 30° C., 35% RH, one-hour ramp-up to 50° C., 90% RH, maintained there for 24 hours, one-hour ramp-down to 30° C., 35% RH. After three such cycles, the segments were cooled to −60° C. and then heated in an oven at 150° C. for 6 hours at ambient relative humidity.

Specular reflectance was again measured at 800 nm with the following results:

|  | Light-absorbing | Specular Reflectance | |
|---|---|---|---|
|  | layer | Before aging | After aging |
| Example 7 | $Cr_3C_2$ | 0.5% | 3.8% |
| Example 8 | $Fe_3C$ | 6.0% | 58.8% |

Recording threshhold (50-ns pulses) was determined before and after aging with the following results:

|  | Before aging | After aging |
|---|---|---|
| Example 7 | 5 mW | 6 mW |
| Example 8 | 6 mW | 11 mW |

We claim:

1. An optical recording medium for use in an optical recording apparatus having a laser diode emitting at a wavelength in the range of 700–900 nm, said medium comprising an optically-flat, disk-shaped, polymeric or glass substrate and a continuous, light-absorbing layer having a thickness of 1–60 nm and in which information is recordable in the form of discrete features creatable by a focused, modulated beam from said laser diode, wherein the improvement comprises:
    said light-absorbing layer comprises a carbide of a metal selected from iron, chromium or alloys therebetween.

2. An optical recording medium as defined in claim 1 including an optical spacer layer beneath the light-absorbing layer.

3. An optical recording medium as defined in claim 2 including a reflecting layer beneath the optical spacer layer.

4. An optical recording medium as defined in claims 2 or 3 wherein the thicknesses of said layers are selected to provide an interferometrically antireflective condition.

5. An optical recording medium as defined in claim 1 including an adhesion-promoting layer between the light-absorbing layer and the substrate.

6. An optical recording medium as defined in claim 3 including an adhesion-promoting layer between the reflecting layer and the substrate.

7. An optical recording medium as defined in claims 1, 2 or 3 having formed in the light-absorbing layer discrete features representing information.

8. An optical recording medium as defined in claim 7 wherein the discrete features are pits.

9. An optical recording medium as defined in claim 7 wherein the discrete features are bubbles.

10. Method of making an optical recording medium for use in an optical recording apparatus having a laser diode emitting at a wavelength in the range of 700–900 nm, said method comprising the steps of depositing onto an optically-flat, disk-shaped, polymeric or glass substrate a continuous, light-absorbing layer having a thickness of 1–60 nm, wherein the improvement comprise:
    said light-absorbing layer comprises a carbide of a metal selected from iron, chromium, and alloys therebetween.

11. Method of making an optical recording medium as defined in claim 10 wherein an optical spacer layer is applied to the substrate and the light-absorbing layer is applied onto the optical spacer layer.

12. Method of making an optical recording medium as defined in claim 11 wherein a reflecting layer is applied to the substrate and the optical spacer layer is applied onto the reflecting layer.

13. Method of making an optical recording medium as defined in claim 12 wherein an adhesion-promoting layer is applied to the substrate before applying the reflecting layer.

14. Method as defined in any of claims 10, 11, 12 or 13 wherein a modulated laser-diode beam is focused on the light-absorbing layer while the substrate is rotated upon its axis, thus creating in the light-absorbing layer discrete features representing information.

15. Method as defined in claim 14 wherein said discrete features are bubbles.

16. Method as defined in claim 14 wherein said discrete features are pits.

17. A method of making an optical recording comprising
    providing an optical recording medium comprising an optically-flat, disk-shaped, polymeric or glass substrate having thereon a continuous, light-absorbing layer comprising a carbide of a metal selected from iron, chromium and alloys therebetween, said layer having a thickness of 1–60 nm,
    rotating said medium upon its axis,
    modulating the output of a laser diode having a wavelength from 700–900 nm to create intensity variations corresponding to information to be recorded on said medium, and
    focusing a beam of light from said laser diode on the light-absorbing layer to thereby create in the layer discrete features representing said information.

* * * * *